April 9, 1957

A. H. JORDAN 2,788,013

RELAY FOR MAINTAINING A CONSTANT RATIO BETWEEN
A PRIMARY VARIABLE AND A SECONDARY VARIABLE
IN RESPONSE TO A TERTIARY VARIABLE

Filed Sept. 10, 1953

INVENTOR.
ARTHUR H. JORDAN
BY Arthur H. Swanson
ATTORNEY.

INVENTOR.
ARTHUR H. JORDAN

United States Patent Office 2,788,013
Patented Apr. 9, 1957

2,788,013

RELAY FOR MAINTAINING A CONSTANT RATIO BETWEEN A PRIMARY VARIABLE AND A SECONDARY VARIABLE IN RESPONSE TO A TERTIARY VARIABLE

Arthur H. Jordan, Collegeville, Pa., assignor to Minneapolis-Honeywell Regulator Company, Minneapolis, Minn., a corporation of Delaware Application September 10, 1953, Serial No. 379,456

4 Claims. (Cl. 137—82)

In industrial process control it is often necessary to ratio or to proportion one variable, called secondary variable, with another, called the primary variable. The primary variable generally is uncontrolled and varies with plant or production requirements. A controller is provided which is responsive to the primary and to the secondary variables and which controls the secondary variable. The input of the primary variable to the controller is varied so as to maintain the ratio between the primary and secondary variables constant. This variation of the input of the primary variable to the controller is done by means of a tertiary variable.

Such ratio control systems have a number of applications in the chemical and process industries for such purposes as: ratioing the flow of absorber oil to rich gas in natural gas absorption plants, the ratioing of gas and air mixtures in combustion work, and the proportioning of chemicals in alkalization plants.

Such ratio controllers can be used on any continuous process where it is desired to control a temperature, pressure, rate of flow of liquids or gases, or liquid level at a fixed ratio to another measured variable.

It is an object of this invention to provide such a ratio control system including means whereby the output of the primary variable, which output forms one input to a controller governing the secondary variable, is modified by the teritary variable so that their joint output is the product of the primary and tertiary variables.

More specifically, it is an object of this invention to provide a mechanical linkage having an input, generally in the form of an air-operated motor. This motor causes a lever having an arcuate surface to rock about a fixed pivot. A second lever has a roller in contact with the arcuate surface so that the second lever is moved longitudinally an amount depending on whether the roller coincides with the pivot of the first lever or is in contact with the arcuate surface at a point spaced from the pivot of the first lever. A third lever is engaged by the pivoted end of the second lever remote from the arcuate surface and forms the output of the linkage. A second input to the linkage is provided by a second motor responsive to the tertiary variable. A fourth lever is pivoted so as to be rotated about a fixed pivot by said second motor and engages the second lever intermediate its ends so as to rock its free end along the arcuate surface. A supporting link is connected to one arm of the fourth lever and to the end of the second lever away from the arcuate surface of the first lever in such a way that the supporting link provides a floating pivot for the second lever substantially coaxial with the fixed pivot of the fourth lever.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Although the primary, secondary and tertiary variables may be of many different sorts, since by far the major application of such ratio control systems is the ratioing of one flow to another, the apparatus will be described using flow control as an example.

Figure 1:
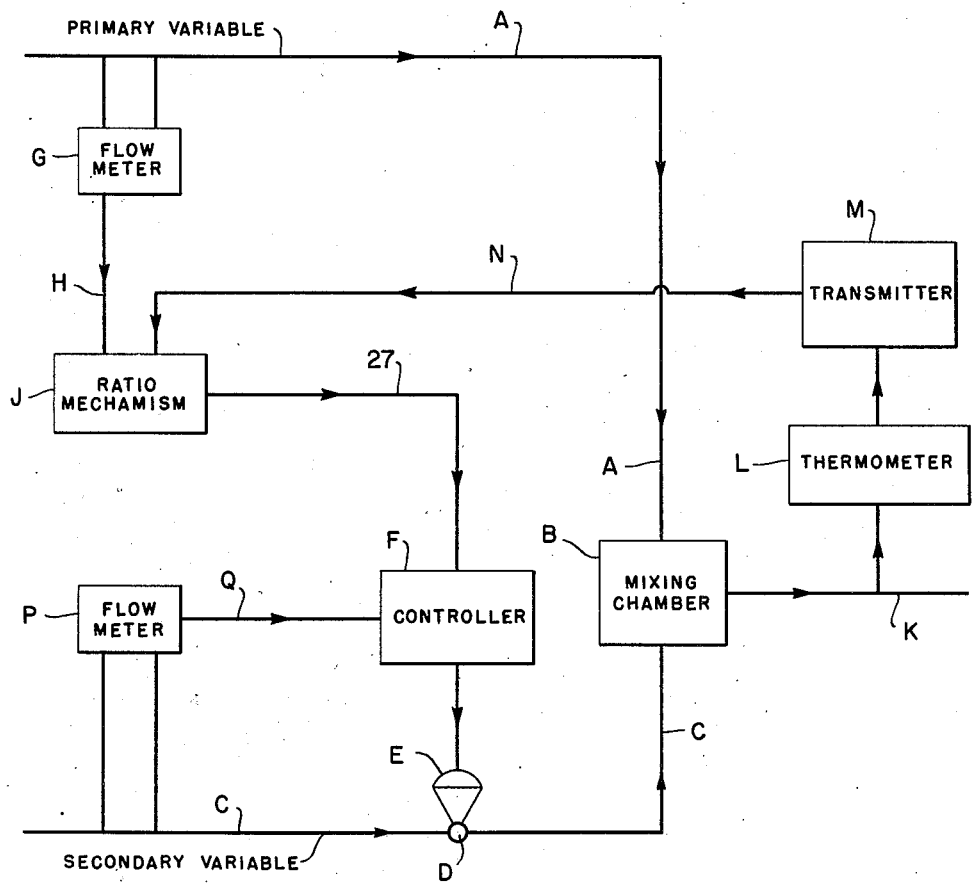
Fig. 1 is a block diagram.

Fig. 1 is a block diagram showing a conduit A through which the primary variable flows to a mixing chamber B where it is mixed with the secondary variable, which flows through a conduit C under the control of a valve D, which is governed by a motor E, such as an air-operated motor, mounted under the control of a controller F, such as an air-operated controller. A flow meter G measures the primary variable and transmits, by conduit H, the primary variable to the ratio mechanism J. From the mixing chamber B, the tertiary variable flows through conduit K, where it is measured by means of thermometer L. Transmitter M converts this temperature to an air pressure, which is conveyed by conduit N to the ratio mechanism J. The secondary variable in conduit C is measured by flow meter P and transmitted by conduit Q to the controller F.

Figure 2:
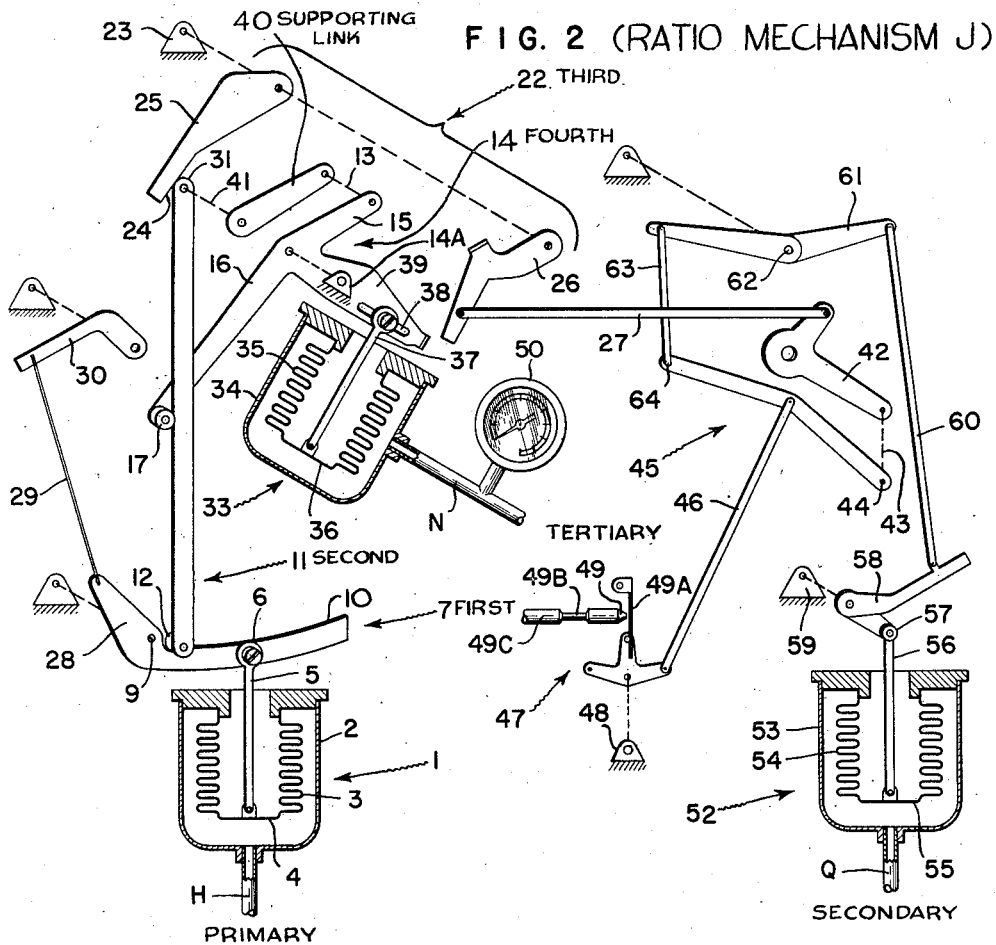
Fig. 2 is a schematic, exploded view showing one modification of the invention.
Figure 3:
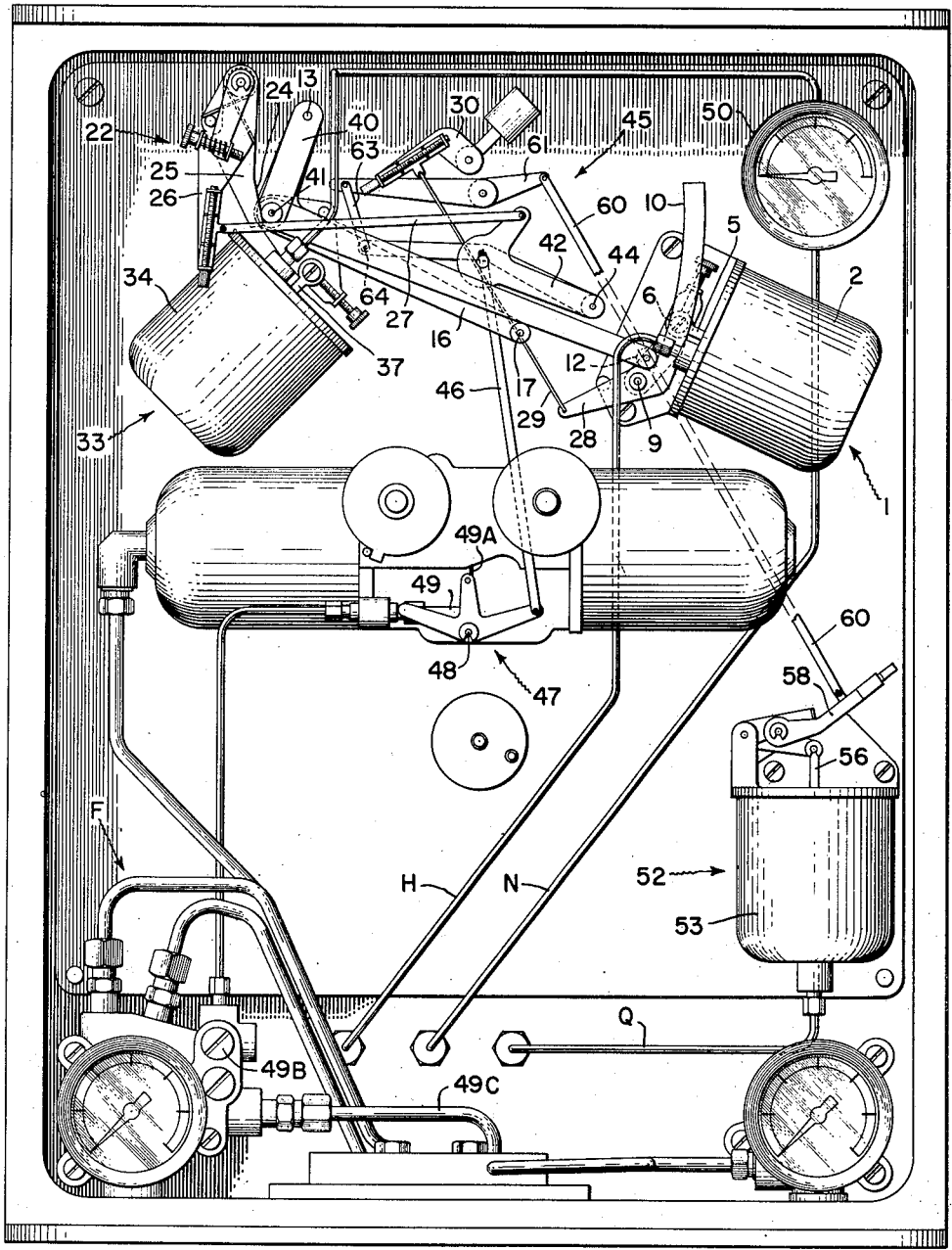
Fig. 3 is a front elevation of the modification of Fig. 2.

Modification of Figs. 2 and 3

Figs. 2 and 3 show one modification of the ratio mechanism J and the controller F.

In Figs. 2 and 3 the ratio mechanism J comprises the following structure. A motor, generally indicated at 1, is responsive to the primary variable, which is introduced in the form of a variable fluid pressure through conduit H. Motor 1 comprises a cup-shaped, rigid casing 2 to which is fastened one end of a flexible bellows 3. The free end 4 of bellows 3 is connected to a link 5, which has pivotal connection 6 with a first lever, generally indicated at 7, mounted on a fixed pivot 9 and having an arcuate face 10. A second lever, generally indicated at 11, has at one end a roller 12 in contact with the arcuate surface 10. The opposite end 31 of lever 11 is loosely pivoted at 41 to and carried on one end of a supporting link 40, which is loosely pivoted at 13 to one arm 15 of a fourth lever, generally indicated at 14. Lever 14 has a third arm 16 which bears at its free end a roller 17 in contact with lever 11 intermediate the ends thereof. Lever 14 is mounted on a fixed pivot 14A.

As is best seen in Fig. 3, supporting link 40 is substantially vertical. Fig. 2 shows that fixed pivot 14A supports fourth lever 14 and pivot 13 which connects the end of arm 15 to the upper end of supporting link 40. The other end of supporting link 40 is connected to end 31 of second lever 11 which is supported intermediate its ends by fixed pivot 14A, arm 16, and roller 17.

First lever 7 has an additional arm 28 to which is connected a link 29 which actuates a lever 30 connected to the primary pen shaft. The end 31 of lever 11 remote from roller 12 abuts against face 24 of arm 25 of a third lever generally indicated at 22. Lever 22 is mounted on a fixed pivot 23.

The tertiary variable, in the form of an air pressure proportional to the tertiary variable, is introduced by conduit N to a second, air-operated motor, generally indicated at 33, and comprising a rigid, cup-shaped casing 34 to which is connected one end of a bellows 35. To the free end 36 of bellows 35 is pivoted a link 37 whose opposite end rides in slot 38 in arm 39 of a fourth lever, generally indicated at 14.

The air-pressure-operated gauge 50 is connected to conduit N and receives the pressure of the air therein. Since this air pressure sets the ratio between the primary and secondary variables, gauge 50 can be calibrated directly in terms of this ratio or proportion.

Arm 26 of the third lever, generally indicated at 22, has, loosely pivoted to it, link 27, which is loosely pivoted, at its opposite end, to a bell crank lever 42, which is loosely pivoted at 43 to one end 44 of a floating lever, generally indicated at 45. From an intermediate point of floating lever 45, a link 46 extends down to a three-armed lever, generally indicated at 47, mounted on a stationary pivot 48 so as to actuate a flapper 49A relative to a nozzle 49. Nozzle 49 is connected, by means of restriction 49B, to a source 49C of fluid under pressure. These form parts of the controller F. Controller F may conveniently be of a well known, commercial type, one embodiment of which is shown in U. S. Patent 2,125,081, patented July 26, 1938, to C. B. Moore. For further details of controller F, reference is made to Patent 2,125,081.

The secondary variable, in the form of a variable air pressure, is introduced by means of conduit Q to a third air-operated motor, generally indicated at 52. Motor 52 is comprised of a rigid, cup-shaped casing 53 to which is connected one end of a flexible bellows 54. The free end 55 of bellows 54 is pivotally connected to a link 56 which is pivotally connected at 57 to a bell crank lever 58 mounted on a stationary pivot 59. One end of a link 60 is pivoted to bell crank lever 58 while the other end is pivoted at one end of lever 61 mounted on stationary pivot 62. The opposite end of lever 61 is pivoted to a link 63 which is pivoted at its opposite end to one end 64 of floating lever 45 opposite to end 44.

*Operation of the modification of Figs. 2 and 3*

Variations in the primary variable cause motor 1 to oscillate first lever 7 about its fixed pivot 9 and, by means of link 29 and bell crank lever 30, indicate the value of the primary variable by means of the primary pen shaft and the primary pen (not shown) mounted thereon.

Depending upon the distance that roller 12 is spaced from the stationary pivot 9 along the arcuate face 10, lever 11 is moved lengthwise. Lever 11 may not move at all, in the case in which its end bearing roller 12 overlies stationary pivot 9, or lever 11 may move a maximum amount, when its end bearing roller 12 is adjacent the free end of arcuate face 10. This lengthwise movement of second lever 11 rocks third lever 22 about its stationary pivot 23. By means of link 27, a bell crank 42 thus rocks the intermediate point of floating lever 45 and, through link 46 and three-armed lever 47, actuates controller F by moving flapper 49A relative to nozzle 49. As is best seen in Fig. 1, the output air pressure from controller F causes motor E to actuate valve D and thus to control the secondary variable passing through conduit C. The controller F is provided with proportional plus reset mode of control so that the secondary variable can be maintained at a shifting set point.

The secondary variable is measured by flow meter P and transmitted through conduit Q to motor 52. Fig. 2 shows that motor 52 rocks bell crank lever 58 about its stationary pivot 59 and causes link 60, lever 61, and a link 63 to actuate end 64 of floating lever 65 and thus actuate controller F in the manner already described.

Referring to Fig. 1, it will be seen that the tertiary variable passing through conduit K is measured by thermometer L and converted by transmitter M to a variable air pressure which is fed through conduit N to the ratio mechanism J and more specifically to the second, air-operated motor 33. Changes of the air pressure in motor 33 cause bellows 35 to lock the fourth lever 14 about its stationary pivot 14A and thereby cause roller 17 to rotate second lever 11 about its floating pivot 41 so as to vary the point of engagement between roller 12 and arcuate surface 10.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is as follows:

1. A relay for maintaining constant the ratio between a primary variable and a secondary variable in response to the variations of a tertiary variable, including, a first lever pivoted to turn about a first stationary axis and having an arc-shaped surface, a second lever extending between said curved surface and a floating pivot, a third lever engaged by said second lever adjacent said floating pivot, a fourth pivoted lever having an arm engaging said second lever intermediate the ends thereof so as to rotate said second lever about its floating pivot and thus move one end of said second lever along said arc-shaped surface toward and away from said first axis, a supporting link pivoted to an arm of said fourth lever and to said second lever so as to provide the floating pivot for said second lever substantially overlying the pivot of said fourth lever, an air-operated motor responsive to variations in a primary variable and connected to oscillate said first lever about said first stationary axis, and a second air-operated motor responsive to variations in a tertiary variable and connected to said fourth lever to rotate it about its fixed axis and to thereby rotate said second lever about its floating pivot.

2. Means for maintaining constant the ratio between a primary variable and a secondary variable in response to the variations of a tertiary variable, said means comprising, a pressure responsive motor governed by said primary variable, a pressure responsive motor governed by said secondary variable, a pressure responsive motor governed by said tertiary variable, a source of compressed fluid, a restriction connected at one end to said source, a nozzle at the other end of said restriction, a flapper cooperating with said nozzle, a system of mechanical linkages each operated by one of said motors to vary the position of said flapper relative to said nozzle, a lever having an arcuate surface and oscillated about a fixed pivot by said motor responsive to said primary variable, another lever abutting at one end against said arcuate surface and movable longitudinally to transmit the oscillation of said first lever, an additional lever oscillated about a fixed pivot by said motor responsive to said tertiary variable, said additional lever engaging said other lever intermediate the ends of said other lever and operable to rotate said other lever and thereby move said one end of said other lever along said arcuate surface, and a supporting link pivoted at one end to an arm of said additional lever at a point spaced from the pivot of said additional lever and pivoted at its other end to the end of said other lever spaced from said arcuate surface, thereby providing a floating pivot for said other lever about a point aligned with the pivot of said additional lever.

3. Apparatus adjustable to vary the output produced by a given input, said apparatus including, a first air-operated motor movable in response to the variations in a primary variable, a first lever pivoted on a first stationary axis and having an arc-shaped surface, a driving connection between said motor and said first lever, a second lever bearing at one end against said arc-shaped surface and having its other end free, a third lever pivoted about a second stationary axis remote from said first stationary axis and engaged by the other end of said second lever, a fourth lever pivoted on a third stationary axis spaced from said first and second stationary axes and having an arm engaging said second lever intermediate the ends of said second lever, a supporting link pivoted to an arm of said fourth lever and pivoted to the other end of said second lever to provide a floating support for the other end of said second lever, a second air-operated motor movable in response to variations in a tertiary variable, and a driving connection between said second motor and said fourth lever whereby said fourth lever is rotated about said third stationary axis by said second motor.

4. Apparatus adjustable to vary the output produced by a given input for maintaining constant the ratio between a primary variable and a secondary variable in response to the variations of a tertiary variable, said apparatus including, an air-operated motor movable in response to the variations in a primary variable, a first lever pivoted on a first stationary axis and having an arc-shaped surface, a driving connection between said motor and said first lever, a second lever bearing at one end against said arc-shaped surface and having its other end free, a third lever pivoted about a second stationary axis remote from said first stationary axis and engaged by the other end of said second lever, a fourth lever pivoted on a third stationary axis spaced from said first and second stationary axes and having an arm engaging said second lever intermediate the ends of said second lever, a supporting link pivoted to an arm of said fourth lever and pivoted to the other end of said second lever to provide a floating support for the other end of said second lever, a second air-operated motor movable in response to variations in a tertiary variable, a driving connection between said second motor and said fourth lever whereby said fourth lever is rotated about said third stationary axis by said second motor, a floating lever, a driving connection between said second lever and one end of said floating lever, a third air-operated motor movable in response to variations in a secondary variable, and a driving connection between said third motor and the other end of said floating lever.

References Cited in the file of this patent

UNITED STATES PATENTS

| | | |
|---|---|---|
| 2,236,097 | Hubbard et al. | Mar. 25, 1941 |
| 2,257,905 | Gorrie | Oct. 7, 1941 |
| 2,310,415 | Frymoyer | Feb. 9, 1943 |
| 2,314,152 | Mallory | Mar. 16, 1943 |
| 2,396,279 | Metsger | Mar. 12, 1946 |
| 2,470,452 | Ackley | May 17, 1949 |
| 2,632,456 | Breedlove | Mar. 24, 1953 |

FOREIGN PATENTS

| | | |
|---|---|---|
| 671,337 | Great Britain | Apr. 30, 1952 |